US011590614B2

(12) United States Patent
Shirakawa et al.

(10) Patent No.: US 11,590,614 B2
(45) Date of Patent: Feb. 28, 2023

(54) FLUX AND SOLDER PASTE

(71) Applicant: SENJU METAL INDUSTRY CO., LTD., Tokyo (JP)

(72) Inventors: Ayaka Shirakawa, Tokyo (JP); Hiroshi Sugii, Tokyo (JP); Atsumi Takahashi, Tokyo (JP); Daisuke Maruko, Tokyo (JP); Hiroyoshi Kawasaki, Tokyo (JP); Masato Shiratori, Tokyo (JP)

(73) Assignee: SENJU METAL INDUSTRY CO., LTD., Tokyo (JP)

( * ) Notice: Subject to any disclaimer, the term of this patent is extended or adjusted under 35 U.S.C. 154(b) by 127 days.

(21) Appl. No.: 17/286,431

(22) PCT Filed: Oct. 21, 2019

(86) PCT No.: PCT/JP2019/041397
§ 371 (c)(1),
(2) Date: Apr. 16, 2021

(87) PCT Pub. No.: WO2020/085333
PCT Pub. Date: Apr. 30, 2020

(65) Prior Publication Data
US 2021/0387292 A1 Dec. 16, 2021

(30) Foreign Application Priority Data
Oct. 25, 2018 (JP) .............................. JP2018-201032

(51) Int. Cl.
*B23K 35/362* (2006.01)
*B23K 35/02* (2006.01)
*B23K 35/36* (2006.01)

(52) U.S. Cl.
CPC .......... *B23K 35/362* (2013.01); *B23K 35/025* (2013.01); *B23K 35/3613* (2013.01)

(58) Field of Classification Search
CPC ............................ B23K 35/362; B23K 35/025
USPC ......................................................... 148/23
See application file for complete search history.

(56) References Cited

U.S. PATENT DOCUMENTS

| | | |
|---|---|---|
| 4,954,184 A | 9/1990 | Conn |
| 5,215,602 A | 6/1993 | Ali et al. |
| 10,556,299 B2 | 2/2020 | Yamasaki et al. |
| 2004/0126270 A1 | 7/2004 | Izumida et al. |
| 2015/0224604 A1 | 8/2015 | Choudhury et al. |
| 2016/0158896 A1 | 6/2016 | Koroki et al. |
| 2016/0158897 A1 | 6/2016 | Koroki et al. |
| 2016/0271737 A1 | 9/2016 | Ikeda et al. |
| 2016/0271738 A1 | 9/2016 | Murphy et al. |
| 2016/0288271 A1 | 10/2016 | Ikeda et al. |
| 2017/0252871 A1 | 9/2017 | Kawasaki et al. |
| 2020/0376607 A1 | 12/2020 | Kawasaki et al. |
| 2021/0245305 A1 | 8/2021 | Kawasaki et al. |

FOREIGN PATENT DOCUMENTS

| | | |
|---|---|---|
| CN | 1603056 A | 4/2005 |
| CN | 1712175 A | 12/2005 |
| CN | 103267834 A | 8/2013 |
| CN | 105431253 A | 3/2016 |
| CN | 105829016 A | 8/2016 |
| EP | 3 062 956 B1 | 9/2019 |
| JP | 2002-224881 A | 8/2002 |
| JP | 2006-181636 A | 7/2006 |
| JP | 2006-212660 A | 8/2006 |
| JP | 2008-030105 A | 2/2008 |
| JP | 2013-049088 A | 3/2013 |
| JP | 2013-126671 A | 6/2013 |
| JP | 2013-237088 A | 11/2013 |
| JP | 2013-237089 A | 11/2013 |
| JP | 2013-237091 A | 11/2013 |
| JP | 2014-069227 A | 4/2014 |
| JP | 2014-087814 A | 5/2014 |
| JP | 2015-020181 A | 2/2015 |
| JP | 2015-020182 A | 2/2015 |
| JP | 2015-098052 A | 5/2015 |
| JP | 5807733 B1 | 11/2015 |
| JP | 2016-500578 A | 1/2016 |
| JP | 2016-026882 A | 2/2016 |
| JP | 2016-068105 A | 5/2016 |
| JP | 2016-179496 A | 10/2016 |
| JP | 2016-537206 A | 12/2016 |
| JP | 6322881 B1 | 5/2018 |
| JP | 2018-136678 A | 8/2018 |
| JP | 2018-167310 A | 11/2018 |
| JP | 2020-011286 A | 1/2020 |
| KR | 10-2016-0078379 A | 7/2016 |
| WO | WO 03/020468 A1 | 3/2003 |
| WO | WO 2007/029589 A1 | 3/2007 |
| WO | WO 2010/113833 A1 | 10/2010 |
| WO | WO 2014/168027 A1 | 10/2014 |

(Continued)

OTHER PUBLICATIONS

International Search Report and Written Opinion for International Application No. PCT/JP2019/020855 dated Aug. 27, 2019.
International Search Report and Written Opinion for International Application No. PCT/JP2019/020798 dated Aug. 27, 2019.
International Search Report for International Application No. PCT/JP2019/046947 dated Mar. 3, 2020.
International Search Report for International Application No. PCT/JP2019/041397 dated Jan. 21, 2020.
[No Author Listed], JIS Z 3282:2017, Soft solders—Chemical compositions and forms. JIS. Mar. 2017:22 pages.
Hasnine et al., Effect of Ge addition on wettability, copper dissolution, microstructural and mechanical behavior of SnCu—Ge solder alloy. J Mater Sci: Mater Electron. Jul. 17, 2017;28:16106-19. doi: 10.1007/s10854-017-7511-4.

(Continued)

*Primary Examiner* — Weiping Zhu
(74) *Attorney, Agent, or Firm* — Wolf, Greenfield & Sacks, P.C.

(57) ABSTRACT

A flux comprising an organic acid; a solvent; and polyoxyethylene behenyl alcohol having an average number of moles of ethylene oxide added of 7 to 40 mol.

4 Claims, No Drawings

(56) References Cited

FOREIGN PATENT DOCUMENTS

WO      WO 2015/066155 A1      5/2015

OTHER PUBLICATIONS

Yamasumi, Examination of sample pretreatment method for quantification of added impurity elements in lead-free solder by ICP-AES. The Japan Society for Analytical Chemistry. Proceedings of the 50th Annual Meeting. Nov. 9, 2011:6. 3 pages.
International Search Report and Written Opinion for International Application No. PCT/JP2018/042943, dated Feb. 19, 2019.
International Preliminary Report on Patentability for International Application No. PCT/JP2018/042943, dated Jun. 4, 2020.
International Preliminary Report on Patentability (Chapter II) for International Application No. PCT/JP2019/046947 dated Jul. 13, 2020.
International Preliminary Report on Patentability for International Application No. PCT/JP2019/041397 dated Apr. 27, 2021.
Office Action for U.S. Appl. No. 17/261,558 dated Jun. 9, 2021 and claims pending as of Jun. 9, 2021.
[No Author Listed] Tin metal JIS H 2108-1996. Japanese Industrial Standard. Nov. 20, 1996, revised Feb. 20, 2009. 7 pages.
U.S. Appl. No. 17/281,205, filed Mar. 29, 2021, Kawasaki et al.
U.S. Appl. No. 17/261,557, filed Jan. 19, 2021, Kawasaki et al.
U.S. Appl. No. 17/261,558, filed Jan. 19, 2021, Kawasaki et al.
PCT/JP2019/020855, Aug. 27, 2019, International Search Report and Written Opinion.
PCT/JP2019/020798, Aug. 27, 2019, International Search Report and Written Opinion.
PCT/JP2019/046947, Mar. 3, 2020, International Search Report.
PCT/JP2019/041397, Jan. 21, 2020, International Search Report.

FLUX AND SOLDER PASTE

RELATED APPLICATIONS

This Application is a National Stage filing under 35 U.S.C. 371 of International Patent Application Serial No. PCT/JP2019/041397, filed Oct. 21, 2019, which claims the benefit of Japanese Patent Application Serial No. 2018-201032, filed Oct. 25, 2018, each of which is herein incorporated by reference in its entirety.

The present invention relates to a flux and a solder paste.

TECHNICAL FIELD

Background Art

The joining and assembly of electronic parts on a board of electronic equipment are often performed by soldering using a solder paste comprising a solder material and a soldering flux (flux), in terms of cost and from the viewpoint of reliability.

Patent Literature 1 discloses a soldering flux containing a surfactant, an acid anhydride having a particular number of carbon atoms, and a base resin in a predetermined proportion. This literature discloses that with the above soldering flux, it is possible to suppress void formation in a solder metal, suppress the scattering of the flux and the solder metal, and easily wash the residue produced after soldering.

CITATION LIST

Patent Literature

Patent Literature 1: Japanese Patent Laid-Open No. 2016-179496

SUMMARY OF INVENTION

Technical Problem

Usually, the residue produced after soldering is often washed using a solvent as in Patent Literature 1. However, from the viewpoint of reducing the environmental load, the residue produced after soldering is preferably washed using water, and a flux excellent in water washability is required.

Therefore, it is an object of the present invention to provide a flux and a solder paste excellent in water washability and printability in good balance.

Solution to Problem

The present inventors have studied diligently in order to solve the above problem, and, as a result, found that by containing an organic acid, a solvent, and polyoxyethylene behenyl alcohol having a particular average number of moles of ethylene oxide added, the obtained flux can solve the above problem, and completed the present invention.

Specifically, the flux of the present invention is as follows.

[1]
A flux comprising an organic acid; a solvent; and polyoxyethylene behenyl alcohol having an average number of moles of ethylene oxide added of 7 to 40 mol.

[2]
The flux according to the above [1], wherein the average number of moles of ethylene oxide added of the polyoxyethylene behenyl alcohol is 10 to 30 mol.

[3]
The flux according to the above [1] or [2], wherein a content of the polyoxyethylene behenyl alcohol is 5 to 20% by mass based on the whole of the flux.

[4]
The flux according to any of the above [1] to [3], comprising one or more selected from the group consisting of a rosin-based resin, an amine, an amine hydrohalide, and an organic halogen compound.

[5]
The flux according to the above [4], comprising the amine hydrohalide.

[6]
A solder paste comprising a solder material and the flux according to any of the above [1] to [5].

The solder paste of the present invention comprises a solder material and the flux of the present invention.

Advantageous Effect of Invention

According to the present invention, a flux and a solder paste capable of improving water washability and printability can be provided.

DESCRIPTION OF EMBODIMENTS

A mode for carrying out the present invention (hereinafter referred to as "this embodiment") will be described below. However, the present invention is not limited to this, and various modifications can be made without departing from the spirit thereof.

As used herein, the content of each element can be measured, for example, by analysis by ICP-AES in accordance with JIS Z 3910.

[Flux]
The flux of this embodiment comprises an organic acid, a solvent, and polyoxyethylene behenyl alcohol (behenyl alcohol ethylene oxide adduct) having an average number of moles of ethylene oxide added of 7 to 40 mol, and thus the water washability and the printability can be improved. Therefore, the flux is preferably used, for example, as a soldering flux.

(Behenyl Alcohol Ethylene Oxide Adduct)
The flux contains a behenyl alcohol ethylene oxide adduct. The present inventors have obtained findings that the skeleton and average number of moles added of an alkylene glycol and the skeleton of an alkyl ether have a significant influence on rheology (viscosity and thixotropic ratio) that depends on water washability and printability. Then, the present inventors have found that by using polyoxyethylene behenyl alcohol having an average number of moles of ethylene oxide added of 7 to 40 mol as a polyalkylene glycol alkyl ether, a flux is excellent in water washability and printability in good balance.

The behenyl alcohol ethylene oxide adduct is represented by the following formula (A).

$$CH_3-(CH_2)_{21}-O-[(CH_2)_2-O]_m-H \quad\quad (A)$$

wherein m represents an average number of moles added.

The average number of moles of ethylene oxide added (m in the above formula (A)) of the behenyl alcohol ethylene oxide adduct is preferably 10 to 30 mol from the viewpoint of even better water washability and printability.

The content of the behenyl alcohol ethylene oxide adduct is preferably 5 to 20% by mass, more preferably 10 to 20% by mass, based on the whole of the flux from the viewpoint of even better water washability and printability.

(Organic Acid)

The flux contains an organic acid (organic acid-based activator) in order to improve the printability. Examples of the organic acid include adipic acid, azelaic acid, eicosanedioic acid, citric acid, glycolic acid, succinic acid, salicylic acid, diglycolic acid, dipicolinic acid, dibutylanilinediglycolic acid, suberic acid, sebacic acid, thioglycolic acid, terephthalic acid, dodecanedioic acid, para-hydroxyphenylacetic acid, picolinic acid, phenylsuccinic acid, phthalic acid, fumaric acid, maleic acid, malonic acid, lauric acid, benzoic acid, tartaric acid, tris(2-carboxyethyl) isocyanurate, glycine, 1,3-cyclohexanedicarboxylic acid, 2,2-bis(hydroxymethyl)propionic acid, 2,2-bis(hydroxymethyl)butanoic acid, 2,3-dihydroxybenzoic acid, glutaric acid, 2,4-diethylglutaric acid, 2-quinolinecarboxylic acid, 3-hydroxybenzoic acid, malic acid, p-anisic acid, stearic acid, 12-hydroxystearic acid, oleic acid, linoleic acid, linolenic acid, dimer acids, hydrogenated dimer acids, trimer acids, and hydrogenated trimer acids.

The content of the organic acid is preferably 1 to 10% by mass based on the whole of the flux from the viewpoint of excellent water washability and printability in even better balance.

(Solvent)

The flux contains a solvent. Examples of the solvent include water, alcohol-based solvents, glycol-based solvents, glycol ether-based solvents, and terpineols. Examples of the alcohol-based solvents include isopropyl alcohol, 1,2-butanediol, isobornyl cyclohexanol, 2,4-diethyl-1,5-pentanediol, 2,2-dimethyl-1,3-propanediol, 2,5-dimethyl-2,5-hexanediol, 2,5-dimethyl-3-hexyne-2,5-diol, 2,3-dimethyl-2,3-butanediol, 1,1,1-tris(hydroxymethyl)ethane, 2-ethyl-2-hydroxymethyl-1,3-propanediol, 2,2'-oxybis(methylene)bis(2-ethyl-1,3-propanediol), 2,2-bis(hydroxymethyl)-1,3-propanediol, 1,2,6-trihydroxyhexane, bis[2,2,2-tris(hydroxymethyl)ethyl] ether, 1-ethynyl-1-cyclohexanol, 1,4-cyclohexanediol, 1,4-cyclohexanedimethanol, erythritol, threitol, guaiacol glycerol ether, 3,6-dimethyl-4-octyne-3,6-diol, and 2,4,7,9-tetramethyl-5-decyne-4,7-diol. Examples of the glycol-based solvents include 1,3-butylene glycol, phenyl glycol, and hexylene glycol. Examples of the glycol ether-based solvents include diethylene glycol mono-2-ethylhexyl ether, ethylene glycol monophenyl ether, 2-methylpentane-2,4-diol, diethylene glycol monohexyl ether, diethylene glycol dibutyl ether, triethylene glycol monobutyl ether, hexyl diglycol, and tetraethylene glycol dimethyl ether.

The content of the solvent may be, for example, more than 0 and 80% by mass or less based on the whole of the flux, and is preferably 20 to 60% by mass.

The flux may contain an ethylene oxide adduct other than the above behenyl alcohol ethylene oxide adduct (another ethylene oxide adduct). Examples of another ethylene oxide adduct include polyoxyethylene behenyl alcohol having an average number of moles of ethylene oxide added of less than 7 mol, alkyl alcohol ethylene oxide adducts (for example, a cetyl alcohol ethylene oxide adduct and a stearyl alcohol oxide adduct), a resorcinol ethylene oxide adduct, and polyethylene glycol. One of these ethylene oxide adducts is used alone, or two or more of these ethylene oxide adducts are used in combination.

The content of the ethylene oxide adduct may be 0 to 30% by mass based on the whole of the flux.

The flux may contain a resin excluding the above-described ethylene oxide adducts. Examples of another resin include rosin-based resins, (meth)acrylic resins, urethane-based resins, polyester-based resins, phenoxy resins, vinyl ether-based resins, terpene resins, modified terpene resins (for example, aromatic modified terpene resins, hydrogenated terpene resins, and hydrogenated aromatic modified terpene resins), terpene phenolic resins, modified terpene phenolic resins (for example, hydrogenated terpene phenolic resins), styrene resins, modified styrene resins (for example, styrene acrylic resins and styrene maleic resins), xylene resins, and modified xylene resins (for example, phenol-modified xylene resins, alkylphenol-modified xylene resins, phenol-modified resol type xylene resins, polyol-modified xylene resins, and polyoxyethylene-added xylene resins). One of these resins is used alone, or two or more of these resins are used in combination. Among these, the resin is preferably one or more selected from the group consisting of rosin-based resins and (meth)acrylic resins. The "(meth)acrylic resins" here refers to a concept including methacrylic resins and acrylic resins.

Examples of the rosin-based resins include raw material rosins such as gum rosins, wood rosins, and tall oil rosins, and derivatives obtained from the raw material rosins. Examples of the derivatives include purified rosins, hydrogenated rosins, disproportionated rosins, polymerized rosins, and α,β-unsaturated carboxylic acid-modified products (acrylated rosins, maleated rosins, fumarated rosins, and the like), and purified products, hydrides, and disproportionated products of polymerized rosins, and purified products, hydrides, and disproportionated products of α,β-unsaturated carboxylic acid-modified products. One of these rosin-based resins is used alone, or two or more of these rosin-based resins are used in combination.

The content of the rosin-based resin is preferably 5% by mass or less, more preferably 0% by mass, based on the whole of the flux from the viewpoint of even better water washability.

Examples of the (meth)acrylic resins include homopolymers of (meth)acrylic monomers, and copolymers of two or more types of acrylic monomers. Examples of the (meth)acrylic monomers include (meth)acrylic acid, itaconic acid, maleic acid, crotonic acid, methyl (meth)acrylate, ethyl (meth)acrylate, butyl (meth)acrylate, hexyl (meth)acrylate, propyl (meth)acrylate, octyl (meth)acrylate, nonyl (meth)acrylate, decyl (meth)acrylate, undecyl (meth)acrylate, dodecyl (meth)acrylate, tridecyl (meth)acrylate, tetradecyl (meth)acrylate, lauryl (meth)acrylate, and stearyl (meth)acrylate. One of these (meth)acrylic resins is used alone, or two or more of these (meth)acrylic resins are used in combination.

The content of the (meth)acrylic resin is, for example, preferably 5% by mass or less, more preferably 0% by mass, based on the whole of the flux.

The content of the resin is preferably 5% by mass or less, more preferably 0% by mass, based on the whole of the flux.

The flux preferably contains an amine-based activator (amine) in order to even more improve the activity. The amine here does not include an amine hydrohalide described later. Examples of the amine include polyethylene glycol-polypropylene glycol copolymers having amino groups for both terminal groups (diamine-terminated PEG-PPG) copolymers, amine aliphatic amines, aromatic amines, amino alcohols, imidazoles, benzotriazoles, amino acids, guanidines, and hydrazides. Examples of the aliphatic amines include dimethylamine, ethylamine, 1-aminopropane, isopropylamine, trimethylamine, allylamine, n-butylamine, diethylamine, sec-butylamine, tert-butylamine, N,N-dimethylethylamine, isobutylamine, and cyclohexylamine. Examples of the aromatic amines include aniline, N-methylaniline, diphenylamine, N-isopropylaniline, and p-isopropylaniline. Examples of the amino alcohols include 2-aminoethanol, 2-(ethylamino)ethanol, diethanolamine, diisopropanolamine, triethanolamine, N-butyldiethanolamine, triisopropanolamine, N,N-bis(2-hydroxyethyl)-N-cyclohexylamine, N,N,N',N'-tetrakis(2-hydroxypropyl) ethylenediamine, and N,N,N',N'',N''-pentakis(2-hydroxypropyl) diethylenetriamine. Examples of the imidazoles include 2-methylimidazole, 2-undecylimidazole, 2-heptadecylimidazole, 1,2-dimethylimidazole, 2-ethyl-4-methylimidazole, 2-phenylimidazole, 2-phenyl-4-methylimidazole, 1-benzyl-2-methylimidazole, 1-benzyl-2-phenylimidazole, 1-cyanoethyl-2-methylimidazole, 1-cyanoethyl-2-undecylimidazole, 1-cyanoethyl-2-ethyl-4-methylimidazole, 1-cyanoethyl-2-phenylimidazole, 1-cyanoethyl-2-undecylimidazolium trimellitate, 1-cyanoethyl-2-phenylimidazolium trimellitate, 2,4-diamino-6-[2'-methylimidazolyl-(1')]-ethyl-s-triazine, 2,4-diamino-6-[2'-undecylimidazolyl-(1')]-ethyl-s-triazine, 2,4-diamino-6-[2'-ethyl-4'-methylimidazolyl-(1')]-ethyl-s-triazine, a 2,4-diamino-6-[2'-methylimidazolyl-(1')]-ethyl-s-triazine isocyanuric acid adduct, a 2-phenylimidazole isocyanuric acid adduct, 2-phenyl-4,5-dihydroxymethylimidazole, 2-phenyl-4-methyl-5-hydroxymethylimidazole, 2,3-dihydro-1H-pyrrolo[1,2-a]benzimidazole, 1-dodecyl-2-methyl-3-benzylimidazolium chloride, 2-methylimidazoline, 2-phenylimidazoline, 2,4-diamino-6-vinyl-s-triazine, a 2,4-diamino-6-vinyl-s-triazine isocyanuric acid adduct, 2,4-diamino-6-methacryloyloxyethyl-s-triazine, epoxy-imidazole adducts, 2-methylbenzimidazole, 2-octylbenzimidazole, 2-pentylbenzimidazole, 2-(1-ethylpentyl) benzimidazole, 2-nonylbenzimidazole, 2-(4-thiazolyl) benzimidazole, and benzimidazole. Examples of the benzotriazoles include 2-(2'-hydroxy-5'-methylphenyl)benzotriazole, 2-(2'-hydroxy-3'-tert-butyl-5'-methylphenyl)-5-chlorobenzotriazole, 2-(2'-hydroxy-3',5'-di-tert-amylphenyl)benzotriazole, 2-(2'-hydroxy-5'-tert-octylphenyl) benzotriazole, 2,2'-methylenebis[6-(2H-benzotriazol-2-yl)-4-tert-octylphenol], 6-(2-benzotriazolyl)-4-tert-octyl-6'-tert-butyl-4'-methyl-2,2'-methylenebisphenol, 1,2,3-benzotriazole, 1-[N,N-bis(2-ethylhexyl)aminomethyl] benzotriazole, carboxybenzotriazole, 1-[N,N-bis(2-ethylhexyl)aminomethyl]methylbenzotriazole, 2,2'-[[(methyl-1H-benzotriazol-1-yl)methyl]imino]bisethanol, 1,2,3-benzotriazole sodium salt aqueous solutions, 1-(1',2'-dicarboxyethyl)benzotriazole, 1-(2,3-dicarboxypropyl)benzotriazole, 1-[(2-ethylhexylamino)methyl]benzotriazole, 2,6-bis[(1H-benzotriazol-1-yl)methyl]-4-methylphenol, and 5-methylbenzotriazole. Examples of the amino acids include alanine, arginine, asparagine, aspartic acid, cysteine hydrochloride, glutamine, glutamic acid, glycine, histidine, isoleucine, leucine, lysine monohydrochloride, methionine, phenylalanine, proline, serine, threonine, tryptophan, tyrosine, valine, β-alanine, γ-aminobutyric acid, δ-aminovaleric acid, ε-aminohexanoic acid, ε-caprolactam, and 7-aminoheptanoic acid. Examples of the guanidines include dicyandiamide, 1,3-diphenylguanidine, and 1,3-di-o-tolylguanidine.

The content of the amine is, for example, 0 to 65% by mass, based on the whole of the flux, and preferably 20 to 65% by mass, more preferably 30 to 55% by mass, from the viewpoint of even better water washability and printability in good balance.

The flux may contain an organic halogen compound in order to improve the activity. The organic halogen compound here does not include the amine hydrohalide described later. Examples of the organic halogen compound include trans-2,3-dibromo-2-butene-1,4-diol, 2,3-dibromo-1,4-butanediol, 2,3-dibromo-1-propanol, 2,3-dichloro-1-propanol, 1,1,2,2-tetrabromoethane, 2,2,2-tribromoethanol, pentabromoethane, carbon tetrabromide, 2,2-bis(bromomethyl)-1,3-propanediol, meso-2,3-dibromosuccinic acid, chloroalkanes, chlorinated fatty acid esters, n-hexadecyltrimethylammonium bromide, triallyl isocyanurate hexabromide, 2,2-bis[3,5-dibromo-4-(2,3-dibromopropoxy)phenyl] propane, bis[3,5-dibromo-4-(2,3-dibromopropoxy)phenyl] sulfone, ethylenebispentabromobenzene, 2-chloromethyloxirane, HET acid, HET anhydride, and bisphenol A bromide type epoxy resins.

The content of the organic halogen compound is, for example, 0 to 5% by mass, based on the whole of the flux, and preferably 0 to 1% by mass from the viewpoint of even better water washability and printability in good balance.

The flux may contain an amine hydrohalide activator (amine hydrohalide) in order to improve the solderability. Examples of the amine hydrohalide include hydrohalides of the amines illustrated as the amine. Examples of the amine hydrohalide include stearylamine hydrochloride, diethylaniline hydrochloride, diethanolamine hydrochloride, 2-ethylhexylamine hydrobromide, pyridine hydrobromide, isopropylamine hydrobromide, cyclohexylamine hydrobromide, diethylamine hydrobromide, monoethylamine hydrobromide, 1,3-diphenylguanidine hydrobromide, dimethylamine hydrobromide, dimethylamine hydrochloride, rosin amine hydrobromides, 2-ethylhexylamine hydrochloride, isopropylamine hydrochloride, cyclohexylamine hydrochloride, 2-pipecoline hydrobromide, 1,3-diphenylguanidine hydrochloride, dimethylbenzylamine hydrochloride, hydrazine hydrate hydrobromide, dimethylcyclohexylamine hydrochloride, trinonylamine hydrobromide, diethylaniline hydrobromide, 2-diethylaminoethanol hydrobromide, 2-diethylaminoethanol hydrochloride, ammonium chloride, diallylamine hydrochloride, diallylamine hydrobromide, monoethylamine hydrochloride, monoethylamine hydrobromide, diethylamine hydrochloride, triethylamine hydrobromide, triethylamine hydrochloride, hydrazine monohydrochloride, hydrazine dihydrochloride, hydrazine monohydrobromide, hydrazine dihydrobromide, pyridine hydrochloride, aniline hydrobromide, butylamine hydrochloride, hexylamine hydrochloride, n-octylamine hydrochloride, dodecylamine hydrochloride, dimethylcyclohexylamine hydrobromide, ethylenediamine dihydrobromide, rosin amine hydrobromides, 2-phenylimidazole hydrobromide, 4-benzylpyridine hydrobromide, L-glutamic acid hydrochloride, N-methylmorpholine hydrochloride, betaine hydrochloride, 2-pipecoline hydroiodide, cyclohexylamine hydroiodide, 1,3-diphenylguanidine hydrofluoride, diethylamine hydrofluoride, 2-ethylhexylamine hydrofluoride, cyclohexylamine hydrofluoride, ethylamine hydrofluoride, rosin amine hydrofluorides, cyclohexylamine tetrafluoroborate, and dicyclohexylamine tetrafluoroborate.

The content of the amine hydrohalide is, for example, 0 to 5% by mass, based on the whole of the flux, and preferably 0 to 1% by mass from the viewpoint of even better water washability and printability in good balance.

The flux preferably comprises one or more selected from the group consisting of a rosin-based resin, an amine, an amine hydrohalide, and an organic halogen compound, more preferably an amine hydrohalide, and further preferably an amine and an amine hydrohalide.

The flux may contain a thixotropic agent. Examples of the thixotropic agent include wax-based thixotropic agents and amide-based thixotropic agents. Examples of the wax-based thixotropic agents include hydrogenated castor oil. Examples of the amide-based thixotropic agents include lauric acid amide, palmitic acid amide, stearic acid amide, behenic acid amide, hydroxystearic acid amide, saturated fatty acid amides, oleic acid amide, erucic acid amide, unsaturated fatty acid amides, p-toluenemethanamide, aromatic amides, substituted amides, methylolstearic acid amide, methylolamide, and fatty acid ester amides. The amide-based thixotropic agents may be bisamide-based thixotropic agents and/or polyamide-based thixotropic agents. Examples of the bisamide-based thixotropic agents include methylenebisstearic acid amide, ethylenebislauric acid amide, ethylenebishydroxystearic acid amide, saturated fatty acid bisamides, methylenebisoleic acid amide, unsaturated fatty acid bisamides, m-xylylenebisstearic acid amide, and aromatic bisamides. Examples of the polyamide-based thixotropic agents include saturated fatty acid polyamides, unsaturated fatty acid polyamides, and aromatic polyamides.

The content of the thixotropic agent may be, for example, 0 to 15% by mass, based on the whole of the flux.

[Solder Paste]

The solder paste of this embodiment comprises a solder material and the flux of this embodiment. The solder paste contains the flux of this embodiment, and thus the water washability and the printability can be improved. The "flux" here refers to the whole of the components in the solder paste other than the solder material.

(Solder Material)

The solder material preferably contains Sn or a Sn-based alloy. The Sn or the Sn-based alloy may comprise unavoidable impurities.

The Sn may be, for example, Sn having a purity of 99.9% or more (3N material), Sn having a purity of 99.99% or more (4N material), or Sn having a purity of 99.999% (5N material).

Examples of the Sn-based alloy include alloys having compositions such as Sn—Ag alloys, Sn—Cu alloys, Sn—Ag—Cu alloys, Sn—Ag—Cu—Ni—Co alloys, Sn—In alloys, Sn—Bi alloys, Sn—Sb alloys, and Sn—Pb alloys, and alloys obtained by adding As, Bi, Sb, Pb, Ag, Cu, In, Ni, Co, Ge, P, Fe, Zn, Al, Ga, and the like to the alloys having the above compositions. The content of Sn in the Sn-based alloy is not particularly limited and can be, for example, more than 40% by mass.

The Sn and the Sn-based alloy are preferably Sn and a Sn—Cu alloy or a Sn—Ag—Cu alloy from the viewpoint of even better joining reliability. From the same viewpoint, the content of Ag is preferably 0 to 4.0% by mass, and the content of Cu is preferably 0 to 3.0% by mass, more preferably 0 to 1.0% by mass, and further preferably 0.3 to 0.75% by mass.

The content of Sn may be, for example, 40% by mass or more, 50% by mass or more, 70% by mass or more, or 90% by mass or more, based on the whole of the solder material. On the other hand, when the solder material contains Pb, the content of Pb based on the whole of the solder material may be 90% by mass or more, and the content of Sn based on the whole of the solder material may be 5% by mass or more, or 10% by mass or more.

The solder material may contain, for example, 20 to 300 ppm by mass of As. When the content of As is 20 ppm by mass or more, viscosity increase is suppressed, and the thickening suppression effect is excellent. When the content of As is 300 ppm by mass or less, the deterioration of wettability can be even more suppressed. Therefore, when the content of As is 20 to 300 ppm by mass, the solder paste of this embodiment can achieve both the thickening suppression effect and reliability in good balance. From the same viewpoint, the content of As is preferably 30 to 250 ppm by mass, more preferably 50 to 200 ppm by mass, based on the whole of the solder material. As may constitute (for example, an intermetallic compound or a solid solution) with Sn or the Sn-based alloy or may be present, for example, as an As simple substance or an oxide, separately from the Sn-based alloy.

The solder material preferably contains 50 ppm by mass (0.0050% by mass) to 3.0% by mass of Bi. When the content of Bi is 50 ppm by mass or more, viscosity increase is suppressed, and the thickening suppression effect is excellent. When the content of Bi is 3.0% by mass or less, the difference between liquidus temperature ($T_L$) and solidus temperature ($T_S$) ($\Delta T = T_L - T_S$) can be decreased, and the reliability of cycle characteristics and the like is excellent. Therefore, when the content of Bi is 50 ppm by mass to 3.0% by mass, the solder paste of this embodiment can achieve both the thickening suppression effect and the reliability in good balance. From the same viewpoint, the content of Bi is preferably 50 ppm by mass (0.0050% by mass) to 1.0% by mass, more preferably 100 ppm by mass (0.010% by mass) to 1.0% by mass, based on the whole of the solder material.

The solder material preferably contains 20 ppm by mass (0.0020% by mass) to 0.5% by mass of Sb. When the content of Sb is 20 ppm by mass or more, viscosity increase is suppressed, and the thickening suppression effect is excellent. When the content of Sb is 0.5% by mass or less, the reliability of wettability, cycle characteristics, and the like is excellent. Therefore, when the content of Sb is 20 ppm by mass to 0.5% by mass, the solder paste of this embodiment can achieve both the thickening suppression effect and the reliability in good balance. From the same viewpoint, the content of Sb is preferably 50 ppm by mass (0.0050% by mass) to 0.3% by mass, more preferably 100 ppm by mass (0.010% by mass) to 0.1% by mass, based on the whole of the solder material.

The solder material preferably contains 20 ppm by mass (0.0020% by mass) to 0.7% by mass of Pb. When the content of Pb is 20 ppm by mass or more, viscosity increase is suppressed, and the thickening suppression effect is excellent. When the content of Pb is 0.7% by mass or less, the difference between liquidus temperature ($T_L$) and solidus temperature ($T_S$) ($\Delta T = T_L - T_S$) can be decreased, and the reliability of cycle characteristics and the like is excellent. Therefore, when the content of Pb is 20 ppm by mass to 0.7% by mass, the solder paste of this embodiment can achieve both the thickening suppression effect and the reliability in good balance. From the same viewpoint, the content of Pb is preferably 50 ppm by mass (0.0050% by mass) to 0.5% by mass, more preferably 100 ppm by mass (0.010% by mass) to 0.3% by mass, based on the whole of the solder material.

Bi may be present in the form of an alloy (for example, an intermetallic compound or a solid solution) with Sn or the Sn-based alloy or may be present separately from Sn and the Sn-based alloy.

The method for producing the solder material of this embodiment is not particularly limited, and examples thereof include a method for producing the solder material of this embodiment by melting and mixing raw material metals.

In this embodiment, the form of the solder material is not particularly limited and may be, for example, a wire-like form or a particulate form such as a ball-like form (solder ball) or a powdery form (solder powder). The form of the solder material is preferably a particulate form, more preferably a powdery form, from the viewpoint of excellent fluidity.

Examples of the method for producing a particulate solder material include a dropping method in which a molten solder material is dropped to obtain particles, a spraying method in which centrifugal spraying is performed, and a method of grinding a bulk solder material. In the dropping method or the spraying method, dropping or spraying is preferably performed in an inert atmosphere or a solvent in order to make the solder material particulate.

When the solder material is particulate, the solder material preferably has a size (particle size distribution) corresponding to symbols 1 to 8 in Classification of Powder Size (Table 2) in JIS Z 3284-1: 2004, more preferably a size (particle size distribution) corresponding to symbols 4 to 8, and further preferably a size (particle size distribution) corresponding to symbols 5 to 8. Thus, soldering to fine parts is possible.

In this embodiment, the size (particle size distribution) of the solder material that is particulate can be performed in accordance with the laser diffraction type particle size distribution measurement test described in 4.2.3 of JIS Z 3284-2: 2014.

In this embodiment, the mass ratio of the content of the solder material to the content of the flux (solder material: flux) may be, for example, 95% by mass of solder material: 5% by mass of flux to 5% by mass of solder material: 95% by mass of flux, preferably 95% by mass of solder material: 5% by mass of flux to 85% by mass of solder material: 15% by mass of flux.

In this embodiment, the solder paste can further comprise a zirconium oxide powder. The content of the zirconium oxide powder based on the mass of the whole of the solder paste is preferably 0.05 to 20.0% by mass, more preferably 0.05 to 10.0% by mass, and most preferably 0.1 to 3% by mass. When the content of the zirconium oxide powder is within the above range, the activators contained in the flux react preferentially with the zirconium oxide powder, and reactions with the Sn and the Sn oxide on the solder powder surface are less likely to occur, and thus the effect of further suppressing viscosity increase due to changes over time is exerted.

The upper limit of the particle diameter of the zirconium oxide powder added to the solder paste is not limited but is preferably 5 μm or less. When the particle diameter is 5 μm or less, the printability of the paste can be maintained. The lower limit is not particularly limited either but is preferably 0.5 μm or more. The above particle diameter is the average value of the equivalent projected circle diameters of particles having an equivalent projected circle diameter of 0.1 μm or more when an SEM photograph of the zirconium oxide powder is taken, and for the particles present in the field of view, the equivalent projected circle diameters are obtained by image analysis. The shape of the zirconium oxide particles is not particularly limited. When the shape is an irregular shape, the contact area with the flux is large, providing the thickening suppression effect. When the shape is spherical, good fluidity is obtained, and therefore excellent printability as the paste is obtained. The shape should be appropriately selected according to the desired characteristics.

In this embodiment, the solder paste can be produced by kneading the solder material (solder powder) and flux of this embodiment by a known method.

The solder paste of this embodiment is used, for example, for a circuit board having a fine structure in electronic equipment and specifically can be applied to soldering portions by a printing method using a metal mask, a discharge method using a dispenser, a transfer method by a transfer pin, or the like, and reflowed.

The present invention will be specifically described below by Examples, but the present invention is not limited to the contents described in the Examples.

EXAMPLES (Preparation of Fluxes)

The materials shown in Table 1 to Table 3 were heated and stirred so as to obtain the compositions shown in Table 1 to Table 3, and then cooled to prepare fluxes. The numerical values in the tables represent the content (% by mass) of the materials when the total of each flux is 100% by mass, and "Bal" represents the balance. The reagent names and CAS numbers of the materials shown in the tables are shown below.

For the fluxes of the Examples and Comparative Examples, (1) flux viscosity, (2) flux thixotropic ratio, (3) water washability, and (4) printability were evaluated. The evaluation methods are shown below, and the evaluation results are shown in Table 1 to Table 3.

(1) Flux Viscosity

Each of the obtained fluxes was adjusted at 25° C., and the viscosity of each flux was obtained at a number of revolutions of 10 rpm using a rotational viscometer (PCU-205, manufactured by Malcom Co., Ltd.). The results are shown in Table 1 to Table 3.

(2) Thixotropic Ratio

Each of the obtained fluxes was adjusted at 25° C., and the thixotropic ratio was obtained by the following formula using a rotational viscometer (PCU-205, manufactured by Malcom Co., Ltd.). The results are shown in Table 1 to Table 3.

thixotropic ratio=LOG(viscosity at which number of revolutions is 3 rpm/viscosity at which number of revolutions is 30 rpm)

(3) Water Washability

A mask having predetermined openings was disposed on a Cu-OSP electrode printed board, a flux was applied, and the mask was removed. Next, solder balls having a composition of Sn-3Ag-0.5Cu (the numerical values are in % by mass) were mounted (placed) on the flux-applied surface, and then reflowed under a nitrogen atmosphere. For the reflow conditions, the temperature was increased from room temperature to 250° C. at a temperature increase rate of 1° C./s and then maintained at 250° C. for 30 s. The wafer after the reflow was immersed and washed for 1 min with water kept warm at 40° C., and dried. Then, one on which no residue of the flux was observed by an optical microscope was evaluated as "○", and one on which the residue was partially observed was evaluated as "x". The results are shown in Table 1 to Table 3.

(4) Flux Printability

A flux was printed on a metal mask for the slump test in JIS Z 3284. After the printing, a case where in a portion having a pattern interval of 0.2 mm, the neighboring portions were not in contact with each other was evaluated as "○", and a case where the neighboring portions were in contact with each other was evaluated as "x". The results are shown in Table 1 to Table 3.

TABLE 1

|  |  | Example 1 | Example 2 | Example 3 | Example 4 | Example 5 | Example 6 | Example 7 | Example 8 | Example 9 |
|---|---|---|---|---|---|---|---|---|---|---|
| Resin | Behenyl alcohol EO 30 mol adduct | 20 | 15 | 15 | 10 | 5 | 10 | 5 | — | 10 |
|  | Behenyl alcohol EO 10 mol adduct | — | — | — | — | — | — | — | 20 | 10 |
|  | Behenyl alcohol EO 5 mol adduct | — | — | — | — | — | — | — | — | — |
|  | Cetyl alcohol EO 5 mol adduct | — | — | — | — | — | — | — | — | — |
|  | Cetyl alcohol EO 10 mol adduct | — | — | — | — | — | — | — | — | — |
|  | Cetyl alcohol EO 30 mol adduct | — | — | — | — | — | — | — | — | — |
|  | Cetyl alcohol EO 40 mol adduct | — | — | — | — | — | — | — | — | — |
|  | Stearyl alcohol EO 40 mol adduct | — | — | — | — | — | 10 | 10 | — | — |
|  | Polyethylene glycol molecular weight 4000 | — | — | — | 10 | 10 | — | — | — | — |
|  | Resorcinol EO 15 mol adduct | — | — | — | — | — | — | — | — | — |
|  | Hydrogenated rosin | — | — | 5 | — | — | — | — | — | — |
| Organic acid | Diglycolic acid | — | — | — | — | — | — | — | — | — |
|  | Glutaric acid | 6 | 6 | 6 | 6 | 6 | 6 | 6 | 6 | 6 |
|  | 2,2-Bishydroxymethylpropionic acid | — | — | — | — | — | — | — | — | — |
| Amine | Diamine-terminated PEG-PPG copolymer | 30 | 30 | 30 | 30 | 30 | 30 | 30 | 30 | 30 |
|  | Tetrakis(2-hydroxypropyl)ethylenediamine | — | — | — | — | — | — | — | — | — |
|  | 2-Methylimidazole | — | — | — | — | — | — | — | — | — |
| Halogen | Ethylamine-HBr | — | — | — | — | — | — | — | — | — |
| Solvent | 1,3-Butylene glycol | 44 | 49 | 44 | 44 | 49 | 44 | 49 | 44 | 44 |
|  | Phenyl glycol | — | — | — | — | — | — | — | — | — |
|  | Hexylene glycol | — | — | — | — | — | — | — | — | — |
|  | Total | 100 | 100 | 100 | 100 | 100 | 100 | 100 | 100 | 100 |
| Prior evaluation | Flux viscosity (mPa·s) | 132 | 70 | — | — | — | — | — | — | — |
|  | Flux thixotropic ratio | 0.83 | 0.80 | — | — | — | — | — | — | — |
| Subsequent evaluation | Flux washability | ○ | ○ | ○ | ○ | ○ | ○ | ○ | ○ | ○ |
|  | Flux printability | ○ | ○ | ○ | ○ | ○ | ○ | ○ | ○ | ○ |
|  | Overall evaluation | ○ | ○ | ○ | ○ | ○ | ○ | ○ | ○ | ○ |

TABLE 2

| Category |  | Comparative Example 1 | Comparative Example 2 | Comparative Example 3 | Comparative Example 4 | Comparative Example 5 | Example 10 | Example 11 | Example 12 | Example 13 | Example 14 |
|---|---|---|---|---|---|---|---|---|---|---|---|
| Resin | Behenyl alcohol EO 30 mol adduct | — | — | — | — | — | 8 | 10 | 15 | 20 | 20 |
|  | Behenyl alcohol EO 10 mol adduct | — | — | — | — | — | — | — | — | — | — |
|  | Behenyl alcohol EO 5 mol adduct | 20 | — | — | — | — | — | — | — | — | — |
|  | Cetyl alcohol EO 5 mol adduct | — | 20 | — | — | — | — | — | — | — | — |
|  | Cetyl alcohol EO 10 mol adduct | — | — | 20 | — | — | — | — | — | — | — |
|  | Cetyl alcohol EO 30 mol adduct | — | — | — | 20 | — | 6 | 2 | — | — | — |
|  | Cetyl alcohol EO 40 mol adduct | — | — | — | — | 20 | — | — | 5 | — | — |
|  | Stearyl alcohol EO 40 mol adduct | — | — | — | — | — | — | — | — | — | — |
|  | Polyethylene glycol molecular weight 4000 | — | — | — | — | — | 6 | 6 | — | — | — |
|  | Resorcinol EO 15 mol adduct | — | — | — | — | — | — | — | — | — | — |
|  | Hydrogenated rosin | — | — | — | — | — | — | — | — | — | — |
| Organic acid | Diglycolic acid | — | — | — | — | — | — | — | — | 6 | — |
|  | Glutaric acid | 6 | 6 | 6 | 6 | 6 | 6 | 6 | 6 | — | — |
|  | 2,2-Bishydroxymethylpropionic acid | — | — | — | — | — | — | — | — | — | 6 |
| Amine | Diamine-terminated PEG-PPG copolymer | 30 | 30 | 30 | 30 | 30 | 30 | 30 | 30 | 30 | 30 |
|  | Tetrakis(2-hydroxypropyl)ethylenediamine | — | — | — | — | — | — | — | — | — | — |
|  | 2-Methylimidazole | — | — | — | — | — | — | — | — | — | — |
| Halogen | Ethylamine-HBr | — | — | — | — | — | — | — | — | — | — |
| Solvent | 1,3-Butylene glycol | 44 | 44 | 44 | 44 | 44 | 46 | 46 | 44 | 44 | 44 |
|  | Phenyl glycol | — | — | — | — | — | — | — | — | — | — |
|  | Hexylene glycol | — | — | — | — | — | — | — | — | — | — |
|  | Total | 100 | 100 | 100 | 100 | 100 | 102 | 100 | 100 | 100 | 100 |
| Prior evaluation | Flux viscosity (mPa·s) | 68 | — | — | — | 35 | — | — | — | — | — |
|  | Flux thixotropic ratio | 0.38 | — | — | — | 0.48 | — | — | — | — | — |
| Subsequent evaluation | Flux washability | x | x | ○ | ○ | ○ | ○ | ○ | ○ | ○ | ○ |
|  | Flux printability | x | x | x | x | x | ○ | ○ | ○ | ○ | ○ |
|  | Overall evaluation | x | x | x | x | x | ○ | ○ | ○ | ○ | ○ |

TABLE 3

| | Category | Example 15 | Example 16 | Example 17 | Example 18 | Example 19 | Example 20 | Example 21 | Comparative Example 6 | Comparative Example 7 | Comparative Example 8 |
|---|---|---|---|---|---|---|---|---|---|---|---|
| Resin | Behenyl alcohol EO 30 mol adduct | 20 | 20 | 20 | 20 | 20 | 15 | 20 | 40 | 2 | 10 |
| | Behenyl alcohol EO 10 mol adduct | — | — | — | — | — | — | — | — | — | — |
| | Behenyl alcohol EO 5 mol adduct | — | — | — | — | — | — | — | — | — | — |
| | Cetyl alcohol EO 5 mol adduct | — | — | — | — | — | — | — | — | — | — |
| | Cetyl alcohol EO 10 mol adduct | — | — | — | — | — | — | — | — | — | — |
| | Cetyl alcohol EO 30 mol adduct | — | — | — | — | — | — | — | — | — | — |
| | Cetyl alcohol EO 40 mol adduct | — | — | — | — | — | — | — | — | — | — |
| | Stearyl alcohol EO 40 mol adduct | — | — | — | — | — | — | — | — | — | — |
| | Polyethylene glycol molecular weight 4000 | — | — | — | — | — | — | — | — | — | — |
| | Resorcinol EO 15 mol adduct | — | — | 10 | — | 30 | — | — | — | — | — |
| | Hydrogenated rosin | — | — | — | — | — | — | — | — | — | 50 |
| Organic acid | Diglycolic acid | — | 1 | — | — | — | — | — | — | 6 | — |
| | Glutaric acid | 10 | — | 6 | 6 | 6 | 6 | 6 | 6 | 6 | 10 |
| | 2,2-Bishydroxymethylpropionic acid | — | — | — | — | — | — | — | — | — | — |
| Amine | Diamine-terminated PEG-PPG copolymer | 30 | 30 | — | 25 | 0 | 65 | 30 | 30 | 30 | — |
| | Tetrakis(2-hydroxypropyl) ethylenediamine | — | — | 30 | — | — | — | — | — | — | — |
| | 2-Methylimidazole | — | — | — | 5 | — | — | — | — | — | — |
| Halogen | Ethylamine-HBr | — | 1 | — | — | — | — | — | — | — | — |
| Solvent | 1,3-Butylene glycol | 40 | 48 | 34 | 44 | 44 | 14 | — | 24 | 62 | 30 |
| | Phenyl glycol | — | — | — | — | — | — | 24 | — | — | — |
| | Hexylene glycol | — | — | — | — | — | — | 20 | — | — | — |
| | Total | 100 | 100 | 100 | 100 | 100 | 100 | 100 | 100 | 100 | 100 |
| Prior evaluation | Flux viscosity (mPa·s) | — | — | — | — | 128 | 115 | — | — | — | — |
| | Flux thixotropic ratio | — | — | — | — | 0.89 | 0.7 | — | — | — | — |
| Subsequent evaluation | Flux washability | ○ | ○ | ○ | ○ | ○ | ○ | ○ | x | ○ | x |
| | Flux printability | ○ | ○ | ○ | ○ | ○ | ○ | ○ | x | x | x |
| | Overall evaluation | ○ | ○ | ○ | ○ | ○ | ○ | ○ | x | x | x |

This application is based on Japanese Patent Application No. 2018-201032 filed with the Japan Patent Office on Oct. 25, 2018, the contents of which are incorporated herein by reference.

INDUSTRIAL APPLICABILITY

The flux and solder paste of the present invention are excellent in water washability and printability and therefore can be utilized in various types of applications.

The invention claimed is:

1. A flux comprising:
an organic acid; a solvent; polyoxyethylene behenyl alcohol having an average number of moles of ethylene oxide added of 7 to 40 mol; and
one or more ingredients selected from the group consisting of a rosin-based resin, an amine, an amine hydrohalide, and an organic halogen compound, wherein
a content of the organic acid is 1 to 10% by mass based on the whole of the flux,
a content of the solvent is more than 0 and 80% by mass or less based on the whole of the flux,
a content of the polyoxyethylene behenyl alcohol is 5 to 20% by mass based on the whole of the flux,
a content of the rosin-based resin is 5% by mass or less based on the whole of the flux,
a content of the amine is 0 to 65% by mass based on the whole of the flux,
a content of the amine hydrohalide is 0 to 5% by mass based on the whole of the flux, and
a content of the organic halogen compound is 0 to 5% by mass based on the whole of the flux.

2. The flux according to claim 1, wherein the polyoxyethylene behenyl alcohol has an average number of moles of ethylene oxide added of 10 to 30 mol.

3. The flux according to claim 1, comprising the amine hydrohalide.

4. A solder paste comprising a solder material and the flux according to claim 1.

* * * * *